(12) United States Patent
Komichi et al.

(10) Patent No.: US 12,351,364 B2
(45) Date of Patent: Jul. 8, 2025

(54) SEAMLESS CAN AND RESIN-COATED METAL SHEET FOR FORMING SEAMLESS CAN

(71) Applicant: TOYO SEIKAN CO., LTD., Tokyo (JP)

(72) Inventors: Yuto Komichi, Yokohama (JP); Nobuhiko Nagai, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 659 days.

(21) Appl. No.: 17/437,895

(22) PCT Filed: Feb. 27, 2020

(86) PCT No.: PCT/JP2020/008087
§ 371 (c)(1),
(2) Date: Sep. 10, 2021

(87) PCT Pub. No.: WO2020/184200
PCT Pub. Date: Sep. 17, 2020

(65) Prior Publication Data
US 2022/0169421 A1    Jun. 2, 2022

(30) Foreign Application Priority Data

Mar. 14, 2019  (JP) ................................. 2019-046658
Jun. 12, 2019  (JP) ................................. 2019-109480

(51) Int. Cl.
*B65D 25/14*    (2006.01)
*B32B 15/08*    (2006.01)
(Continued)

(52) U.S. Cl.
CPC .............. *B65D 25/14* (2013.01); *B32B 15/09* (2013.01); *B65D 17/02* (2013.01); *B65D 25/34* (2013.01);
(Continued)

(58) Field of Classification Search
CPC ...................................... B32B 15/09
See application file for complete search history.

(56) References Cited

U.S. PATENT DOCUMENTS

| | | | |
|---|---|---|---|
| 5,229,214 A | 7/1993 | Maze et al. | |
| 2007/0218226 A1* | 9/2007 | Tadaki | B32B 27/36 428/34.7 |

(Continued)

FOREIGN PATENT DOCUMENTS

| | | |
|---|---|---|
| CN | 1809498 A | 7/2006 |
| CN | 105098104 A | 11/2015 |

(Continued)

OTHER PUBLICATIONS

English machine translation for 2002-205743. (Year: 2002).*

(Continued)

*Primary Examiner* — Michael C Miggins
(74) *Attorney, Agent, or Firm* — Sughrue Mion, PLLC (57) ABSTRACT

A seamless can having a bottom section and a body section, wherein a thermoplastic resin coating is formed on an outer surface side of the can over a polyester-based paint film. The polyester-based paint film includes a polyester-based paint composition which contains a colorant in an amount of 20 parts by mass or less relative to 100 parts by mass of a total resin solid content and a curing agent in an amount of 5 to 43 parts by mass relative to 100 parts by mass of a polyester (Continued)

Enlarged view of X portion resin, and an entire outer surface of the can including the bottom section is colored. Also disclosed is a resin-coated metal sheet for forming a seamless can including the thermoplastic resin coating that is applied over a polyester-based paint film on a surface of the metal sheet, the polyester-based paint film having a thickness of 7 μm or less.

10 Claims, 2 Drawing Sheets

(51) Int. Cl.
  *B32B 15/09* (2006.01)
  *B65D 17/00* (2006.01)
  *B65D 25/34* (2006.01)
  *C09D 167/02* (2006.01)
(52) U.S. Cl.
  CPC .......... *B32B 15/08* (2013.01); *B65D 2203/00* (2013.01); *C09D 167/02* (2013.01)

(56) References Cited

U.S. PATENT DOCUMENTS

| | | | |
|---|---|---|---|
| 2011/0274922 A1 | 11/2011 | Yasue et al. | |
| 2016/0115346 A1* | 4/2016 | Nagai | C09D 167/02 428/458 |
| 2018/0291232 A1 | 10/2018 | Kashiwakura et al. | |
| 2020/0122431 A1 | 4/2020 | Ooshima et al. | |

FOREIGN PATENT DOCUMENTS

| | | |
|---|---|---|
| CN | 105324242 A | 2/2016 |
| JP | 55-163138 A | 12/1980 |
| JP | 2001-353812 A | 12/2001 |
| JP | 2009-208799 A | 9/2009 |
| JP | 2012-025131 A | 2/2012 |
| JP | 5007482 B2 | 8/2012 |
| WO | 2016/186138 A1 | 11/2016 |

OTHER PUBLICATIONS

English machine translation for JP2002-205743 (Year: 2002).*
English machine translation for 2012025131 (Year: 2012).*
Japanese Office Action dated Jul. 12, 2023 in Japanese Application No. 2021-504913.
Extended European Search Report dated Nov. 16, 2022, issued in European Application No. 20769187.4.
International Search Report of PCT/JP2020/008087 dated Apr. 21, 2020 [PCT/ISA/210].
Office Action issued Jul. 25, 2022 in Chinese Application No. 202080020296.7.

\* cited by examiner

FIG. 1

FIG. 2

SEAMLESS CAN AND RESIN-COATED METAL SHEET FOR FORMING SEAMLESS CAN

CROSS REFERENCE TO RELATED APPLICATIONS

This application is a National Stage of International Application No. PCT/JP2020/008087, filed Feb. 27, 2020, claiming priority to Japanese Patent Application No. 2019-046658, filed Mar. 14, 2019 and Japanese Patent Application No. 2019-109480, filed Jun. 12, 2019.

TECHNICAL FIELD

The present invention relates to a seamless can and a resin-coated metal sheet for forming a seamless can, and more particularly relates to a resin-coated seamless can in which an entire outer surface of the can, which includes a bottom section of the can, is colored, and a resin-coated metal sheet capable of forming such a resin seamless can with good productivity.

BACKGROUND ART

Seamless cans formed by the drawing and ironing processes of an aluminum sheet or a steel sheet are widely distributed in the field of beverages. After molded, such a seamless can is completed by forming a chemical conversion coating on the inner and outer surfaces, followed by the application of a protective coating paint to the inner surface and printing to the outer surface of the can (Patent Document 1, etc.). However, the printing applied to the outer surface of the can is applied only to the body section of the can, thus leading to a problem of poor decorative properties of the can as a whole. Specifically, the bottom section of a seamless can typically includes a bottom portion located in a central portion, a ground-contacting portion (rim) descending from a peripheral edge of the bottom portion, and a chime portion extending outward and upward with an inclination from the ground-contacting portion, reaching a lower end of the body section. However, despite the fact that the chime portion, as well as the body section, is a portion that is visible when the can is in an upright state, a seamless can is used in a state where the printing is only applied to the body section of the can, and the bottom section, which includes the chime portion, remains in a base color of the metal sheet.

To solve such a problem, printing also on the bottom section of the outer surface of the can is considered. However, printing on the body section and the chime portion at the same time is difficult, and is unpractical from the viewpoints of productivity and economic efficiency.

In addition, as for a drawn and ironed can (DI can), a paint for improving transportability of a can body needs to be applied on the ground-contacting portion immediately after formation of the can body. In a case where the chime portion and the bottom portion are painted, after the inner surface is painted and printing is applied on the body section, the chime portion and the bottom portion each need to be coated with a different paint using a painting method or device different from the one used for painting the ground-contacting portion. This leads to an increase in the number of processes, and again results in poor performance in terms of productivity and economic efficiency.

In recent years, resin-coated seamless cans formed using a resin-coated metal sheet that is obtained by laminating a thermoplastic resin film, an example of which includes a polyester film, onto a surface of a metal sheet, and subjecting such a resin-coated metal sheet to a process such as the drawing and ironing processes have been proposed. The reasons for this include that those cans do not need the inner surface painting to ensure corrosion resistance of the inner surface of the cans, and those cans are excellent in retaining the flavor of the contents (flavor retention properties) (Patent Document 2, etc.).

CITATION LIST

Patent Literature

Patent Document 1: JP 5007482 B
Patent Document 2: JP 2001-353812 A

SUMMARY OF INVENTION

Technical Problem

Even for such a resin-coated seamless can, printing is applied only to the outer surface of the body section of the can after the formation of the can body, and painting or printing on the bottom section of the can is not performed. Thus, the resulting can is not satisfactory in terms of decorative properties of the entire can. In addition, for resin-coated seamless cans, inclusion of a white pigment or the like in the resin coating in the resin-coated metal sheet has also been proposed in order to impart the decorative properties to the entire can. However, the resin coating is required to have processability and adhesion that can withstand severe processing, and thus, adding a pigment or the like to the resin coating while maintaining the processability and adhesion is not easy.

Thus, an object of the present invention is to provide a resin-coated seamless can in which, without compromising the processability and adhesion of its resin coating, the entire can including the bottom section of the can is colored without undergoing a printing process, and to provide a resin-coated metal sheet for forming such a resin-coated seamless can.

Solution to Problem

An embodiment of the present invention provides a seamless can including a bottom section and a body section, characterized in that
a thermoplastic resin coating is formed over a polyester-based paint film on an outer surface side of the can, the polyester-based paint film including a polyester-based paint composition containing:
a colorant in an amount of 20 parts by mass or less relative to 100 parts by mass of a total resin solid content and
a curing agent in an amount of 5 to 43 parts by mass relative to 100 parts by mass of polyester resin,
wherein an entire outer surface of the can, which includes the bottom section, is colored.

In the seamless can according to an embodiment of the present invention, the following are suitable:
1. the polyester-based paint film has a thickness of 7 μm or less;
2. the bottom section includes:
a bottom portion that is bulging upward and located in a central portion,
a ground-contacting portion that is descending from a peripheral edge of the bottom portion, and a chime portion that is extending outward and upward with an inclination from the ground-contacting portion and reaching a lower end of the body section, and 3. a printed image is formed such that the bottom section is located in an upper portion of the seamless can in an upright state.

An embodiment of the present invention also provides a resin-coated metal sheet for forming a seamless can, the resin-coated metal sheet characterized by including:

a thermoplastic resin coating that is applied over a polyester-based paint film on a surface of the metal sheet, which is a surface that serves as an outer surface of a can, the polyester-based paint film including a polyester-based paint composition which contains:

a colorant in an amount of 20 parts by mass or less relative to 100 parts by mass of a total resin solid content and a curing agent in an amount of 5 to 43 parts by mass relative to 100 parts by mass of a polyester resin, and the polyester-based paint film having a thickness of 7 μm or less.

In the resin-coated metal sheet for forming a seamless can according to an embodiment of the present invention, the following are suitable:

1. the polyester-based paint composition contains a polyester resin as a base resin, and any of a phenolic resin, an amino resin, or an isocyanate compound as the curing agent; and 2. the metal sheet is a pure aluminum sheet or an aluminum alloy sheet.

Advantageous Effects of Invention

In the seamless can according to an embodiment of the present invention, the entire seamless can, which includes the bottom section of the can, is colored and thus has excellent decorative properties.

In addition, in the seamless can according to an embodiment of the present invention, the entire seamless can, which includes the bottom section of the can, is colored without undergoing a painting process or a printing process, thus significantly improving productivity and economic efficiency in comparison with DI cans in which not only the body section but also the chime portion, the ground-contacting portion, and the bottom portion constituting the bottom section of the can each need to be painted using a different paint by a different painting method and device in separate processes.

Furthermore, the paint film formed on the metal sheet surface improves the adhesion between the metal sheet and the polyester resin coating, thus ensuring the adhesion of the polyester resin coating also when the metal sheet is subjected to a severe processing, such as the drawing and ironing processes.

Moreover, the printed image is formed such that the colored bottom section of the can is to be an upper portion of the seamless can in an upright state, thus the upper portion in the upright state is the bottom section of the can with excellent decorative properties, thus enabling the seamless can to attract more attention of consumers. Thus, the seamless can (product) may be placed with such a bottom section of the can facing upward when the can is displayed for sales. This placement enables the seamless can to be more conspicuous than a seamless can (product) with poor decorative properties that is placed with its can end, on which a portion to be opened with a pull-tab is formed, facing upward. This can increase the commercial value of the product.

DESCRIPTION OF EMBODIMENTS

Figure 1:
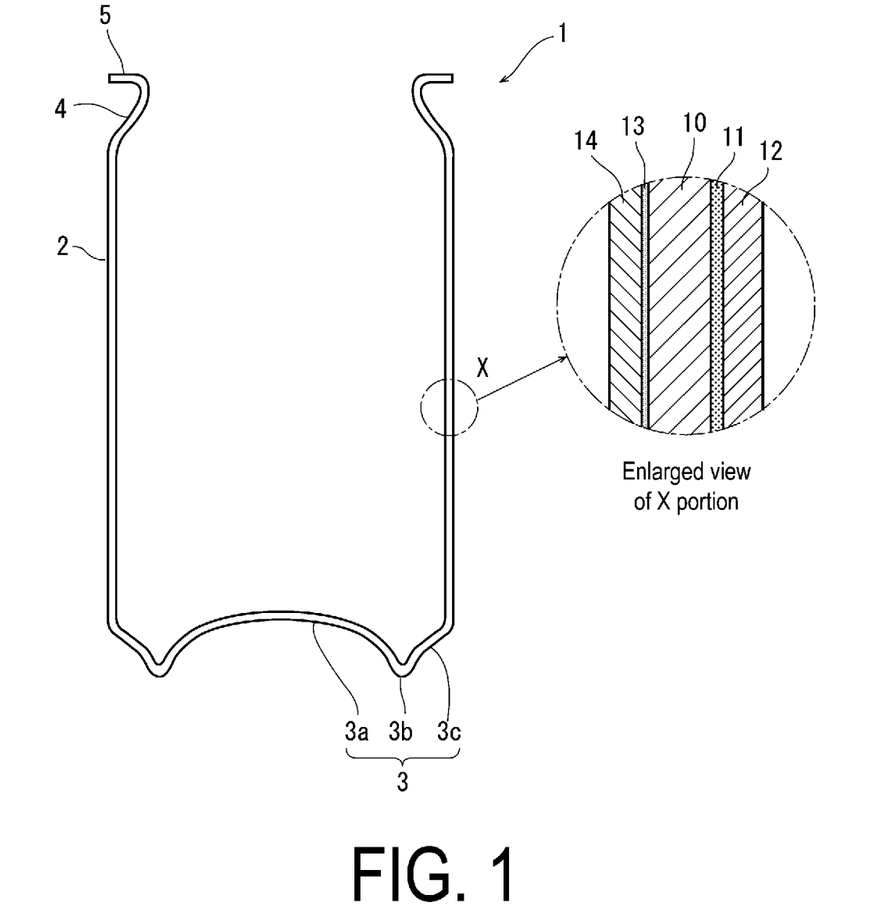
FIG. 1 is a diagram illustrating an example of a seamless can according to an embodiment of the present invention.

FIG. 1 is a diagram illustrating an example of a seamless can according to an embodiment of the present invention, in which a seamless can illustrated in its entirety as 1 has a body section 2 having an outer surface in a straight body shape and a bottom section 3 closing a lower portion of the body section 2. An upper portion of the body section 2 extends to a drawn neck-in portion 4, and a flange portion 5 is formed on an upper end of the neck-in portion 4. In addition, in the bottom section 3, a central portion is configured to be a dome portion 3a bulging upward, and a ground-contacting portion 3b descending from a peripheral portion of the dome portion 3a is formed, further from the ground-contacting portion 3b, a chime portion 3c extending outward and upward with an inclination is formed, and an upper end of the chime portion 3c reaches the body section 2.

Furthermore, as is clear from a cross-sectional view illustrating an enlarged X portion of the body section of the seamless can, this seamless can is formed of a resin-coated metal sheet in which a thermoplastic resin coating 12 is formed on an outer surface side of the can of a metal sheet 10 over a polyester-based paint film 11 containing a colorant, and a thermoplastic resin coating 14 is formed on an inner surface side of the can of the metal sheet 10 over a primer 13.

Hereinafter, the resin-coated metal sheet and seamless can according to an embodiment of the present invention will be described.

Resin-Coated Metal Sheet

Important features of the resin-coated metal sheet for forming a seamless can according to an embodiment of the present invention is to include:

a thermoplastic resin coating applied over a polyester-based paint film onto a surface of the metal sheet, which is a surface that serves as an outer surface of the can, in which the polyester-based paint film includes a polyester-based paint composition which contains a colorant in an amount of 20 parts by mass or less relative to 100 parts by mass of a total resin solid content (a total of a polyester resin and a curing agent).

As described above, the formation of the thermoplastic resin coating over the paint film can impart the appearance in which the entire can including the bottom section of the can is colored when the resin-coated metal sheet is formed into a seamless can, improves the adhesion between the thermoplastic resin coating and the metal sheet, and thus can impart processing adhesion that can withstand severe can manufacturing and processing.

Metal Sheet

In an embodiment of the present invention, for the metal sheet, a surface-treated steel sheet of various types or a light metal sheet of aluminum or the like that have been used in forming seamless cans in the related art can be used.

The surface-treated steel sheet that can be used includes one that is obtained by annealing a cold rolled steel sheet, then subjecting such a sheet to temper rolling or secondary cold rolling, and then to one, or two or more types of surface treatments, such as zinc plating, tin plating, nickel plating, electrolytic chromate treatment, chromate treatment, or zirconium compound treatment. In an embodiment of the present invention, from the viewpoints of paint film adhesion and corrosion resistance, an electrolytic chromate-treated steel sheet {tin-free steel (hereinafter referred to as "TFS")} can be particularly preferably used, and the TFS suitably includes a metal chromium layer from 10 to 200 mg/m$^2$ and a chromium hydrated oxide layer from 1 to 50 mg/m$^2$ (as chromium). Another example of the surface-treated steel sheet includes a tin sheet with a tin plating amount from 0.5 to 11.2 g/m$^2$. The tin sheet is desirably chromate-treated, sodium dichromate-treated, or phosphate-chromate-treated to have from 1 to 30 mg/m$^2$ of chromium. As yet another example, an aluminum-coated steel sheet, such as aluminum-plated or aluminum pressure-welded steel sheet, is used.

For the light metal sheet, in addition to what is called an aluminum sheet, an aluminum alloy sheet is used. Aluminum alloy sheets with excellent corrosion resistance and processability are those with a composition containing: from 0.2 to 1.5 wt. % of Mn, from 0.8 to 5 wt. % of Mg, from 0.25 to 0.3 wt. % of Zn, and 0.15 to 0.25 wt. % of Cu, with the balance being Al. These light metal sheets are also desirably chromate-treated, phosphate-chromate-treated, zirconium compound-treated, or the like to have a chromium content from 20 to 300 mg/m$^2$ in terms of metal chromium.

In an embodiment of the present invention, in particular, an aluminum sheet can be suitably used. Actively utilizing the luster of the aluminum sheet eliminates the need for hiding the base color and can reduce the amount of colorant to be used, and thus can improve can manufacturability. Moreover, the luster of the aluminum sheet combined with color development by the colorant enables obtaining a seamless can excellent particularly in appearance properties.

The original sheet thickness of the metal sheet varies with the type of metal, the application or size of the container, but typically the metal sheet preferably has a thickness from 0.10 to 0.50 mm. Of the metal sheets, for the surface-treated steel sheet, the thickness is preferably from 0.10 to 0.30 mm from the viewpoints of strength of the seamless can to be obtained and formability, and for the light metal sheet, the sheet preferably has a thickness from 0.15 to 0.40 mm.

Polyester-Based Paint Composition

In an embodiment of the present invention, an important feature is that a paint film composed of the polyester-based paint composition containing 20 parts by mass of a colorant relative to 100 parts by mass of total resin solid content is formed on the surface of the metal sheet, the surface to be an outer surface side of the can. This allows the entire can including the bottom section of the can to be colored when the metal sheet is formed into the seamless can, and this eliminates the need for painting the bottom section of the can separately from the body section of the can after forming the seamless can, which has been required for seamless cans in the related art, thus improving productivity and economic efficiency.

For a polyester used as a base resin for the paint composition, a known polyester resin composed of a polyvalent carboxylic acid component and a polyhydric alcohol component described below can be used.

Examples of the polyvalent carboxylic acid component include aromatic dicarboxylic acids, such as terephthalic acid, isophthalic acid, orthophthalic acid, and naphthalenedicarboxylic acid; aliphatic dicarboxylic acids, such as succinic acid, glutaric acid, adipic acid, azelaic acid, sebacic acid, dodecanedioic acid, and dimer acid; unsaturated dicarboxylic acids, such as maleic acid (maleic anhydride), fumaric acid, and terpene-maleic adducts; alicyclic dicarboxylic acids, such as 1,4-cyclohexanedicarboxylic acid, tetrahydrophthalic acid, hexahydroisophthalic acid, and 1,2-cyclohexenedicarboxylic acid; trivalent or higher valent carboxylic acids, such as trimellitic acid, (trimellitic anhydride), pyromellitic acid, (pyromellitic anhydride), and methylcyclohexenetricarboxylic acid; and monocarboxylic acids, such as 4,4-bis(4'-hydroxyphenyl)-pentanoic acid, 4-mono(4'-hydroxyphenyl)-pentanoic acid, and p-hydroxybenzoic acid. From these, one, or two or more can be selected and used.

In addition, examples of the polyhydric alcohol component include aliphatic glycols, such as ethylene glycol, propylene glycol (1,2-propanediol), 1,3-propanediol, 1,4-butanediol, 1,2-butanediol, 1,3-butanediol, 2-methyl-1,3-propanediol, neopentyl glycol, 1,5-pentanediol, 1,6-hexanediol, 3-methyl-1,5-pentanediol, 2-ethyl-2-butyl-1,3-propanediol, 2,4-diethyl-1,5-pentanediol, 1-methyl-1,8-octanediol, 3-methyl-1,6-hexanediol, 4-methyl-1,7-heptanediol, 4-methyl-1,8-octanediol, 4-propyl-1,8-octanediol, and 1,9-nonanediol; ether glycols, such as diethylene glycol, triethylene glycol, polyethylene glycols, polypropylene glycols, and polytetramethylene glycols; alicyclic polyalcohols, such as 1,4-cyclohexanedimethanol, 1,3-cyclohexanedimethanol, 1,2-cyclohexanedimethanol, tricyclodecane glycols, and hydrogenated bisphenols; and trihydric or higher polyalcohols, such as trimethylolpropane, trimethylolethane, and pentaerythritol. From these, one, or two or more can be selected and used.

The polyester resin preferably has a number average molecular weight in a range of 3000 to 100000, an acid value in a range of 0 to 50 mg KOH/g, and a glass transition temperature in a range of −20 to 100° C.

Curing Agent

For the curing agent used in the polyester-based paint composition according to an embodiment of the present invention, a curable resin having a functional group that can react with a functional group of polyester resins, such as a carboxyl group or furthermore a hydroxyl group, is used. Examples include curing agents composed of a phenolic resin, an isocyanate compound, or an amino resin. These resins are used alone or in combination of two or more.

Of the above curing agents, although a resole-type phenolic resin or an amino resin can be suitably used, a paint film formed using a phenolic resin becomes yellow, and thus, an amino resin is desirably used to express an original color of the colorant.

The resole-type phenolic resin is a resin obtained by reacting a phenolic monomer and formaldehyde in the presence of an alkaline catalyst. Examples of the phenolic monomer used include o-cresol, p-cresol, p-tert-butylphenol, p-ethylphenol, 2,3-xylenol, 2,5-xylenol, phenol, m-cresol, m-ethylphenol, 3,5-xylenol, and m-methoxyphenol. From these, one, or two or more can be selected and used.

For the amino resin, for example, a urea resin, a melamine resin, or a benzoguanamine resin can be used. More specifically, examples include methylated urea resins, methyl-etherified urea resins, butyl-etherified urea resins, mixed etherified urea resins of methyl ether and butyl ether; melamine resins, such as methylolated melamine resins, methyl-etherified melamine resins, butyl-etherified melamine resins, and mixed etherified melamine resins of methyl ether and butyl ether; methylolated benzoguanamine resins, methyl-etherified benzoguanamine resins, butyl-etherified benzoguanamine resins, and mixed etherified benzoguanamine resins of methyl ether and butyl ether.

Colorant

In an embodiment of the present invention, examples of the colorant used to color the paint film include, but are not limited to, organic pigments, such as azo-based pigments, phthalocyanine-based pigments, condensed polycyclic pigments, and dye lake-based pigments; inorganic pigments, such as oxides, silicates, ferrocyanide-based compounds; brightening pigments, such as aluminum-based brightening pigments (such as polarizing pearl pigments), mica-based brightening pigment, and glass-based brightening pigments. One, or two or more appropriate pigments can be used according to the design of the appearance of the target seamless can. To adjust color, physical properties, or the like, a white pigment, such as titanium oxide and zinc oxide, or an extender pigment, such as calcium carbonate, can also be blended.

The colorant is preferably added in an amount of 20 parts by mass or less and particularly from 1 to 10 parts by mass relative to 100 parts by mass of total resin solid content (a total of a polyester resin and a curing agent) of the paint composition. The colorant if contained in an amount greater than the above range would reduce processing adhesion between the metal sheet and the thermoplastic resin coating and make the color difference apparent between the body section and the bottom section of the can less processed than the body section. In addition, this would reduce the stability of the paint composition, would cause precipitation, separation, and viscosity change during long-term storage, and would reduce the coatability.

Preparation of Paint Composition

The polyester paint composition used in an embodiment of the present invention can be prepared by blending by dissolving a curing agent in an amount from 5 to 43 parts by mass, in particular from 8 to 18 parts by mass, in an organic solvent per 100 parts by mass of the polyester resin(s).

At this time, the solution preferably contains from 0.01 parts by mass to 3 parts by mass of an acid catalyst as a curing catalyst relative to 100 parts by mass of total resin solid content (a total of a polyester resin and a curing agent). Examples of the acid catalyst include sulfuric acid, p-toluenesulfonic acid, dodecylbenzenesulfonic acid, naphthalenesulfonic acid, dinonylnaphthalenesulfonic acid, dinonylnaphthalenedisulfonic acid, camphorsulfonic acid, phosphoric acids, and those obtained by amine-blocking these (partial or total neutralization with an amine compound). From these, one can be used, or two or more in combination. Of these acid catalysts, dodecylbenzenesulfonic acid and an amine-blocked dodecylbenzenesulfonic acid are particularly preferred from the viewpoint of compatibility with the resin and hygienic properties.

The organic solvent is preferably those having a plasticizing effect on the polyester resin and amphiphilicity. Examples of such an organic solvent include alcohols, such as ethanol, n-propanol, isopropanol, n-butanol, isobutanol, sec-butanol, tert-butanol, isoamyl alcohol, sec-amyl alcohol, tert-amyl alcohol, n-hexanol, and cyclohexanol; ketones, such as methyl ethyl ketone, methyl isobutyl ketone, and ethyl butyl ketone; cyclic ethers, such as tetrahydrofuran, dioxane, and 1,3-dioxolane; glycol derivatives, such as ethylene glycol, ethylene glycol monomethyl ether, ethylene glycol monoethyl ether, ethylene glycol monobutyl ether, ethylene glycol monomethyl ether acetate, diethylene glycol, diethylene glycol monomethyl ether, diethylene glycol monoethyl ether, diethylene glycol monobutyl ether, diethylene glycol ethyl ether acetate, propylene glycol, propylene glycol monomethyl ether, propylene glycol monobutyl ether, and propylene glycol methyl ether acetate; 3-methoxy-3-methyl butanol, 3-methoxybutanol, acetonitrile, dimethylformamide, dimethylacetamide, diacetone alcohol, and ethyl acetoacetate.

In addition, the organic solvent used in dissolving the polyester resin can be distilled off by heating or distilled off under reduced pressure as necessary. The method of distilling off the organic solvent is desirably distillation under reduced pressure at 100° C. or lower and more preferably distillation under reduced pressure of 80° C. or lower to prevent condensation of a phenolic resin with heat during the distillation of the organic solvent. In this case, distilling off the total organic solvent provides a completely water-based resin composition; however, the resin composition desirably contains from 3 mass % to 20 mass % of the organic solvent from the viewpoints of stability, film-forming properties, or the like of the dispersion.

The paint composition can be applied to the metal sheet surface by a method known in the art, such as a roll coating method, a spraying method, an immersion method, or a brush painting method, and the baking conditions of the paint film are at 100 to 300° C. and for 5 seconds to 30 minutes and further preferably at 150 to 270° C. and for 15 seconds to 15 minutes.

In addition, the film thickness of the paint film in terms of dry film thickness is preferably 7 μm or less, particularly in a range from 0.4 to 3.0 μm. With a film thickness in the above range, a polyester-based paint film with good color development can be formed in the seamless can with good adhesion.

Thermoplastic Resin Coating

In the resin-coated metal sheet according to an embodiment of the present invention, the thermoplastic resin applied to the metal sheet over the paint film described above is not particularly limited. Examples of the thermoplastic resin include polyolefins, such as crystalline polypropylenes, crystalline propylene-ethylene copolymers, crystalline polybutene-1, crystalline poly(4-methylpentene-1), low-, medium-, or high-density polyethylenes, ethylene-vinyl acetate copolymers (EVA), ethylene-ethyl acrylate copolymers (EEA), and ion cross-linked olefin copolymers (ionomers); aromatic vinyl copolymers, such as polystyrenes and styrene-butadiene copolymers; vinyl halide polymers, such as polyvinyl chlorides and vinylidene chloride resins; nitrile polymers, such as acrylonitrile-styrene copolymers and acrylonitrile-styrene-butadiene copolymers; polyamides, such as nylon 6, nylon 66, and para- or meta-xylylene adipamide; polyesters, such as poly(ethylene terephthalate)s (PET) and poly(tetramethylene terephthalate)s; various polycarbonates; and plastic films composed of a thermoplastic resin, such as polyacetals (such as a polyoxymethylene).

In an embodiment of the present invention, of the thermoplastic resins described above, in particular, a polyester resin can be suitably used because of its excellent transparency and ease of visual identification of the color of the colored paint film from the exterior.

The polyester resin that can be suitably used may be a homo poly(ethylene terephthalate) but may be a copolymerized polyester alone containing an acid component other than terephthalic acid in an amount of 30 mol % or lower in terms of the acid component and an alcohol component other than ethylene glycol in an amount of 30 mol % or lower in terms of the alcohol component or their blend material.

Examples of the acid component other than terephthalic acid include isophthalic acid, naphthalenedicarboxylic acid, cyclohexanedicarboxylic acid, p-β-oxyethoxybenzoic acid, diphenoxyethane-4,4'-dicarboxylic acid, 5-sodium sulfoisophthalic acid, hexahydroterephthalic acid, succinic acid, adipic acid, sebacic acid, dodecanedioic acid, dimer acid, trimellitic acid, and pyromellitic acid.

Examples of the alcohol component other than ethylene glycol include glycol components, such as propylene glycol, 1,4-butanediol, neopentyl glycol, 1,6-hexylene glycol, diethylene glycol, triethylene glycol, cyclohexanedimethanol, an ethylene oxide adduct of bisphenol A, trimethylolpropane, and pentaerythritol.

In particular, the alcohol component other than ethylene glycol is preferably any of a poly(ethylene terephthalate), an isophthalic acid copolymerized poly(ethylene terephthalate), a naphthalenedicarboxylic acid co-polymerized poly(ethylene terephthalate), and a blend of a poly(ethylene terephthalate)/a poly(butylene terephthalate).

The polyester resin should have a molecular weight in a range where film forming occurs, preferably having an inherent viscosity ($\eta$) of 0.5 or higher, particularly in a range from 0.52 to 0.70, as measured using a phenol/tetrachloroethane mixed solvent as a solvent from the viewpoints of barrier properties against a corrosion component and mechanical properties, and preferably has a glass transition point of 50° C. or higher, particularly preferably in a range of 60° C. to 80° C.

To the polyester film, a blended agent for films known per se, a lubricant, an antiblocking agent, a pigment, an antistatic agent of various types, an antioxidant, or the like can be blended with a known formulation.

The thermoplastic resin may be formed into a film and then applied to coat a painted metal sheet by a thermal bonding method, or a heat-molten thermoplastic resin may be extruded into a film shape using an extruder and directly applied to coat onto a metal sheet by an extrusion lamination method.

In addition, when the thermoplastic resin is formed into a thermoplastic resin film and then applied to coat, the film may be stretched, but an unstretched film is preferred from the viewpoint of forming processability and dent resistance.

The thickness of the polyester film is typically preferably in a range from 5 to 40 μm.

In the resin-coated metal sheet according to an embodiment of the present invention, the surface to be the inner surface side of the can is not particularly limited, but the thermoplastic resin coating described above for the outer surface coating is preferably formed from the viewpoint of productivity.

In addition, the thermoplastic resin coating applied to the surface of the metal sheet, the surface to be the inner surface side of the can, can also be formed by a thermal bonding method of the thermoplastic resin film or by an extrusion lamination method of a molten thermoplastic resin as described above for the outer surface of the can. Furthermore, in this case, the thermoplastic resin coating may be formed directly on the metal sheet surface or can be applied to coat over an adhesive resin layer known in the art.

Seamless Can

The seamless can according to an embodiment of the present invention is formed by using the resin-coated metal sheet according to an embodiment of the present invention described above, stamping out the resin-coated metal sheet, and subjecting the stamped-out sheet to processes known in the art, such as drawing, drawing-ironing, drawing and redrawing, bending and stretching by drawing and redrawing (drawing for thinning or stretching), or bending stretching and ironing by drawing and redrawing.

Preferably, bending and stretching and/or ironing by redrawing is performed to thin the sidewall portion. The thinning is preferably performed to give a thickness of the body section of the can of from 20 to 95%, in particular from 30 to 90%, of the original sheet thickness of the resin-coated metal sheet by bending and stretching and/or ironing in comparison with the bottom section of the can.

The formed seamless can is obtained by doming the bottom section of the can and then performing post-processing, such as washing and drying, outer surface printing, neck-in processing, and flange processing.

As described above, the seamless can according to an embodiment of the present invention has substantially the same color in the bottom section as the body section because of the presence of the polyester-based paint film colored with a colorant and has excellent appearance properties in comparison with seamless cans known in the art in which only the body section is painted and/or printed and the bottom section is in the color of the base metal. In addition, in the bottom section that has been processed to the lesser degree compared to the body section, the color develops slightly more strongly than in the body section. And thus this can provide the bottom section with high decorative properties while providing coloration not compromising the printed image to the body section where the printing is applied. Furthermore, using an aluminum sheet as a metal sheet can further provide a metallic luster and excellent decorative properties.

Moreover, printing the printed image formed on the body section vertically upside down such that the bottom section serves as the upper portion of the seamless can in the upright state enables the conspicuous upper portion of the seamless can to have decorative properties and also can further increase the decorative properties in comparison with typical seamless cans, in which the can end having the portion to be opened, the portion provided with the pull-tab, comes to the upper portion.

Figure 2:
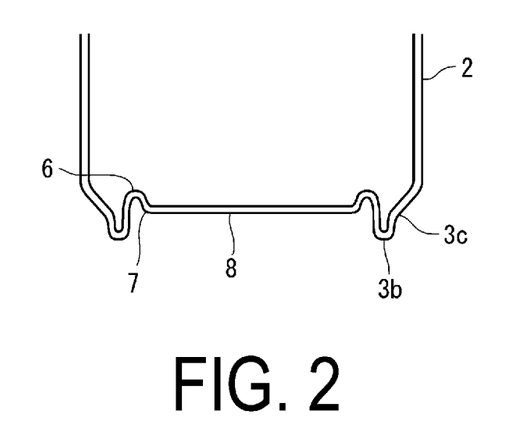
FIG. 2 is a diagram illustrating another embodiment of a bottom section of a can.

In FIG. 1 described above, the bottom section 3 has a central portion configured to be the dome portion 3a bulging upward, but the shape of the bottom section is not limited to this. For example, the central portion may have a flat shape like a base shape, as illustrated in FIG. 2, in which the bottom section constitutes: a ground-contacting portion (rim portion) 3b convex outward of the can; a chime portion 3c extending outward and upward with an inclination from the ground-contacting portion 3b and reaching the body section; an annular concave portion 6 continuously adjacent to the upper end of the inner wall of the ground-contacting portion 3b and concave inward of the can; and further a flat center panel 8 continuing to the inner wall side of the annular concave portion 6 over a corner portion (central panel edge) 7.

Can End

The seamless can according to an embodiment of the present invention can be formed into a canned product by seaming a can end, such as an easy-open end of a stay-on tab type or an easy-open end of a full open type known in the art.

A colored can end formed from a resin-coated metal sheet similar to that of the seamless can may be used to color the entire canned product, and of course an uncolored can end can also be used.

EXAMPLES

Example 1

Preparation of Primer

Examples of preparations of a polyester-based primer according to an embodiment of the present invention and a comparative primer are shown below. "Parts" in the text and in the table indicate "parts by mass".

Preparation of Polyester Resin

Into a 2-L separable flask, 50 parts of terephthalic acid, 282 parts of isophthalic acid, 403 parts of cyclohexanedimethanol, and 0.14 parts of titanium tetrabutoxide were charged, and the temperature was gradually increased to 220° C. over 4 hours, and an esterification reaction was performed while water was distilled off. After a predetermined amount of water was distilled off, an initial polymerization under reduced pressure was performed to 10 mmHg over 30 minutes as well as the temperature was increased to 250° C., and a late polymerization was performed at 1 mmHg or lower for 50 minutes while the temperature was maintained. Then, the polymerization under reduced pressure was stopped, a resin was collected, and a polyester was obtained. The molar ratio of the resulting polyester resin component is shown in Table 1.

Preparation of Curing Agent

First, 100 parts of m-cresol, 180 parts of 37 mass % formalin aqueous solution, and 1 part of sodium hydroxide were added and reacted at 60° C. for 3 hours, and then dehydration was performed at 50° C. under reduced pressure for 1 hour. Then, 100 parts of n-butanol was added, and a reaction was performed at 110° C. for 4 hours. After completion of the reaction, the resulting solution was filtered, and a resole-type phenolic resin derived from m-cresol was prepared.

Preparation of Color Primer

Into a flask 100 parts of the resulting polyester resin and 2 parts of food yellow No. 4 as a colorant, and a solvent were charged, and glass beads were added. After dispersion using a desktop batch sand mill for 120 minutes, the glass beads were removed, and a paint liquid was obtained. This paint liquid was warmed and dissolved with stirring at 100° C. or lower. After complete dissolution, the solution was cooled to room temperature, and 10 parts of a predetermined resole-type phenolic resin and 2 parts of a curing catalyst were added with good stirring, and a polyester-based color primer was prepared. For the curing catalyst, Cycat 602 (available from Nihon Cytec Industries Inc.) was used.

For the method of adding the colorant, a technique known in the art can also be used.

Manufacture of Thermoplastic Resin-Coated Metal Sheet

A chemical conversion treatment was performed on both surfaces of a sheet of an aluminum alloy JIS 3104 with a thickness of 0.27 mm using "Alchrome K702" available from Nihon Parkerizing Co., Ltd. to form a surface-treated coating composed of phosphate-chromate, and a surface-treated metal sheet was obtained. The surface of this surface-treated sheet, the surface to be an outer surface side of the can, was roll-coated with the polyester-based color primer. The polyester-based color primer was baked at 250° C., and a primer with a thickness of 2.0 μm was formed and wound.

As this primer-coated surface-treated metal sheet was unwound, the thermoplastic resin was hot-laminated on both surfaces of the metal sheet by extrusion coating. For the thermoplastic resin on the outer surface side of the can, a thermoplastic resin coating with a two-layer structure composed of a lower layer of a 7-μm thick 15 mol % isophthalic acid-containing polyethylene terephthalate (hereinafter described as "PET/IA15") and an upper layer of a 3-μm thick PET/IA7.5 was used. The thermoplastic resin coating on the inner surface side of the can was a thermoplastic resin coating with a two-layer structure with a lower layer of a 6-μm thick PET/IA15 and an upper layer of a 6-μm thick PET/IA2. A Grammar Wax was then applied to the inner and outer surfaces, the metal sheet was wound, and a thermoplastic resin-coated metal sheet was manufactured.

Formation of Seamless can

The thermoplastic resin-coated metal sheet was blanked, drawn and ironed, and the open end was trimmed to a predetermined size. The resulting can body was heat set at 200° C. for 30 seconds, printed, and a finishing varnish was applied and baked at 200° C. for 40 seconds, and the opening end was necked and flanged, and a seamless can with a capacity of 350 mL, a can body diameter of 211, and a neck portion diameter of 206 was produced.

Examples 2 to 28 and Comparative Examples 1 to 5

Thermoplastic resin-coated metal sheets and seamless cans were produced in the same manner as in Example 1 except for changing the composition of the primer, the film thickness of the primer, the type of the colorant, and the amount of the colorant added as shown in the table.

For the primers of Examples 2 to 28 and Comparative Examples 1 to 5, various polyester resins shown in the table were prepared in the same manner as in the synthesis example described above by changing the monomer amount of the polyester resin component. In addition, the primers were prepared to give ratios of the various polyester resins and curing agents shown in the table. For the curing agent of Example 9, a blocked isocyanate compound (VESTANAT B1370 available from Evonik Degussa Japan Co., Ltd.) was used, and for the curing agent of Example 10, an amino-based resin (Mycoat 506 available from Nihon Cytec Industries Inc.) was used.

Evaluation Method

Stability of Paint Liquid

The state of the coating liquid at 37° C. and 1 month after liquid preparation of the polyester-based color primer composition was observed for presence or absence of precipitate, separation, viscosity change, and the like. An example without any problems was evaluated as "Good", and an example with any problem was evaluated as "Poor".

Formability (Body Breaking Resistance)

By the drawing and ironing described above, 500 cans were formed. An example having caused one or more broken bodies was evaluated "Poor", and an example with no broken body was evaluated as "Good".

Peelability of Flange-Corresponding Portion (Processing Adhesion)

The open end (trimming portion) was examined for the outer surface of the seamless can after the heat setting described above, and a metal exposure length (peel portion length) from the open end was measured with a microscope. Twenty cans were investigated, and the maximum release length among the 20 cans was rated according to the following criteria. An example having caused a broken body was not evaluated for the following peelability of the flange-corresponding portion.

Excellent: The maximum peel length was zero.

Good: The maximum peel length was shorter than 0.1 mm.

Marginal: The maximum peel length was 0.1 mm or longer and less than 0.5 mm.
Poor: The maximum peel length was 0.5 mm or longer.

TABLE 1

| | | Polyester resin (parts) | Curing agent (parts)*1 | | | Tere-phthalic acid | Iso-phthalic acid | Naphthalene-dicarboxylic acid | Trimellitic acid | Sebacic acid | Ethylene glycol | Pro-pylene glycol | 2-methyl-1,3-propanediol | 1,4-butanediol | Cyclo-hexane-methanol | Colorant (parts)*2 | | | | | Total |
| | | | A Ph | B Is | C Am | | | | | | | | | | | A | B | C | D | E | |
|---|---|---|---|---|---|---|---|---|---|---|---|---|---|---|---|---|---|---|---|---|---|
| Examples | 1 | 100 | 11 | | | 7.5 | 42.5 | 0.0 | 0.0 | 0.0 | 0.0 | 0.0 | 0.0 | 0.0 | 50.0 | 2.0 | | | | | 2.0 |
| | 2 | 100 | 11 | | | 7.5 | 42.5 | 0.0 | 0.0 | 0.0 | 0.0 | 0.0 | 0.0 | 0.0 | 50.0 | 5.0 | | | | | 5.0 |
| | 3 | 100 | 11 | | | 7.5 | 42.5 | 0.0 | 0.0 | 0.0 | 0.0 | 0.0 | 0.0 | 0.0 | 50.0 | 10.0 | | | | | 10.0 |
| | 4 | 100 | 11 | | | 7.5 | 42.5 | 0.0 | 0.0 | 0.0 | 0.0 | 0.0 | 0.0 | 0.0 | 50.0 | 20.0 | | | | | 20.0 |
| | 5 | 100 | 25 | | | 7.5 | 42.5 | 0.0 | 0.0 | 0.0 | 0.0 | 0.0 | 0.0 | 0.0 | 50.0 | 5.0 | | | | | 5.0 |
| | 6 | 100 | 43 | | | 7.5 | 42.5 | 0.0 | 0.0 | 0.0 | 0.0 | 0.0 | 0.0 | 0.0 | 50.0 | 5.0 | | | | | 5.0 |
| | 7 | 100 | 11 | | | 7.5 | 42.5 | 0.0 | 0.0 | 0.0 | 0.0 | 0.0 | 0.0 | 0.0 | 50.0 | 3.0 | | | | | 3.0 |
| | 8 | 100 | 11 | | | 7.5 | 42.5 | 0.0 | 0.0 | 0.0 | 0.0 | 0.0 | 0.0 | 0.0 | 50.0 | 4.0 | | | | | 4.0 |
| | 9 | 100 | | 11 | | 7.5 | 42.5 | 0.0 | 0.0 | 0.0 | 0.0 | 0.0 | 0.0 | 0.0 | 50.0 | 4.0 | | | | | 4.0 |
| | 10 | 100 | | | 11 | 7.5 | 42.5 | 0.0 | 0.0 | 0.0 | 0.0 | 0.0 | 0.0 | 0.0 | 50.0 | 4.0 | | | | | 4.0 |
| | 11 | 100 | 11 | | | 7.5 | 42.5 | 0.0 | 0.0 | 0.0 | 0.0 | 0.0 | 0.0 | 0.0 | 50.0 | | 4.0 | | | | 4.0 |
| | 12 | 100 | 11 | | | 7.5 | 42.5 | 0.0 | 0.0 | 0.0 | 0.0 | 0.0 | 0.0 | 0.0 | 50.0 | | | 4.0 | | | 4.0 |
| | 13 | 100 | 11 | | | 7.5 | 42.5 | 0.0 | 0.0 | 0.0 | 0.0 | 0.0 | 0.0 | 0.0 | 50.0 | | | | 4.0 | | 4.0 |
| | 14 | 100 | 11 | | | 7.5 | 42.5 | 0.0 | 0.0 | 0.0 | 0.0 | 0.0 | 0.0 | 0.0 | 50.0 | | | | | 4.0 | 4.0 |
| | 15 | 100 | 11 | | | 7.5 | 42.5 | 0.0 | 0.0 | 0.0 | 0.0 | 0.0 | 0.0 | 0.0 | 50.0 | 19.5 | | 0.5 | | | 20.0 |
| | 16 | 100 | 11 | | | 7.5 | 42.5 | 0.0 | 0.0 | 0.0 | 0.0 | 0.0 | 0.0 | 0.0 | 50.0 | 9.3 | | 3.0 | | | 12.3 |
| | 17 | 100 | 11 | | | 7.5 | 42.5 | 0.0 | 0.0 | 0.0 | 0.0 | 0.0 | 0.0 | 0.0 | 50.0 | 11.0 | | 0.3 | | | 11.3 |
| | 18 | 100 | 11 | | | 7.5 | 42.5 | 0.0 | 0.0 | 0.0 | 0.0 | 0.0 | 0.0 | 0.0 | 50.0 | 7.0 | | 0.2 | | | 7.2 |
| | 19 | 100 | 11 | | | 7.5 | 42.5 | 0.0 | 0.0 | 0.0 | 0.0 | 0.0 | 0.0 | 0.0 | 50.0 | | 3.5 | | 0.2 | | 3.7 |
| | 20 | 100 | 11 | | | 7.5 | 42.5 | 0.0 | 0.0 | 0.0 | 0.0 | 0.0 | 0.0 | 0.0 | 50.0 | | 2.0 | | 0.9 | | 2.9 |
| | 21 | 100 | 11 | | | 7.0 | 40.0 | 0.0 | 3.0 | 0.0 | 0.0 | 0.0 | 0.0 | 0.0 | 50.0 | | 3.5 | | 0.2 | | 3.7 |
| | 22 | 100 | 11 | | | 7.0 | 40.0 | 0.0 | 3.0 | 0.0 | 0.0 | 0.0 | 0.0 | 0.0 | 50.0 | | 3.5 | | 0.2 | | 3.7 |
| | 23 | 100 | 11 | | | 7.5 | 42.5 | 0.0 | 0.0 | 10.0 | 8.0 | 0.0 | 0.0 | 0.0 | 50.0 | 9.3 | | 3.0 | | | 12.3 |
| | 24 | 100 | 11 | | | 7.5 | 42.5 | 5.0 | 0.0 | 0.0 | 0.0 | 12.0 | 0.0 | 0.0 | 50.0 | 11.3 | | 3.7 | | | 15.0 |
| | 25 | 100 | 11 | | | 6.3 | 35.7 | 0.0 | 3.0 | 0.0 | 0.0 | 0.0 | 15.0 | 0.0 | 15.0 | | 3.5 | | 0.2 | | 3.7 |
| | 26 | 100 | 11 | | | 7.0 | 40.0 | 0.0 | 3.0 | 0.0 | 0.0 | 0.0 | 20.0 | 10.0 | 20.0 | | 3.5 | | 0.2 | | 3.7 |
| | 27 | 100 | 11 | | | 14.5 | 25.5 | 0.0 | 0.0 | 0.0 | 0.0 | 0.0 | 0.0 | 20.0 | 30.0 | | 3.5 | | 0.2 | | 3.7 |
| | 28 | 100 | 18 | | | 7.5 | 42.5 | 0.0 | 0.0 | 0.0 | 0.0 | 0.0 | 0.0 | 0.0 | 50.0 | | 5.0 | | 0.3 | | 5.3 |
| Comparative Examples | 1 | 100 | 67 | | | 7.5 | 42.5 | 0.0 | 0.0 | 0.0 | 0.0 | 0.0 | 0.0 | 0.0 | 50.0 | | 3.5 | | 0.2 | | 3.7 |
| | 2 | 100 | 186 | | | 7.5 | 42.5 | 0.0 | 0.0 | 0.0 | 0.0 | 0.0 | 0.0 | 0.0 | 50.0 | | 3.5 | | 0.2 | | 3.7 |
| | 3 | 100 | 11 | | | 7.5 | 42.5 | 0.0 | 0.0 | 0.0 | 0.0 | 0.0 | 0.0 | 0.0 | 50.0 | | 3.5 | | 0.2 | | 3.7 |

TABLE 1-continued

| Polyester resin (parts) | Curing agent (parts)*1 | | | Tere- phthalic acid | Iso- phthalic acid | Naphthalene- dicarboxylic acid | Timellitic acid | Sebacic acid | Ethylene glycol | Pro- pylene glycol | 2-methyl- 1,3- propanediol | 1,4- butanediol | Cyclo- hexane- methanol | Colorant (parts)*2 | | | | | Total |
|---|---|---|---|---|---|---|---|---|---|---|---|---|---|---|---|---|---|---|---|
| | Ph A | Is B | Am C | | | | | | | | | | | A | B | C | D | E | |
| 4 100 | 11 | | | 7.5 | 42.5 | 0.0 | 0.0 | 0.0 | 0.0 | 0.0 | 0.0 | 0.0 | 50.0 | | 28.3 | | 1.7 | | 30.0 |
| 5 100 | 11 | | | 7.5 | 42.5 | 0.0 | 0.0 | 0.0 | 0.0 | 0.0 | 0.0 | 0.0 | 50.0 | | 28.3 | | 1.7 | | 30.0 |

*1 A: Phenolic resin
B: Isocyanate compound
C: Amino-based resin
Parts by mass relative to 100 parts of polyester resin
*2 A: Food yellow No. 4
B: Diarylide yellow
C: Condensed azo red
D: Naphthol red
E: Ultramarine blue
Parts by mass relative to 100 parts of resin solid content

TABLE 2

| | | Film thickness (μm) | Stability of paint liquid | Body breaking resistance | Peelability of flange-corresponding portion |
|---|---|---|---|---|---|
| | | | | | Evaluation Can manufacturing suitability |
| Examples | 1 | 1.0 | Good | Good | Good |
| | 2 | 1.0 | Good | Good | Good |
| | 3 | 1.0 | Good | Good | Good |
| | 4 | 1.0 | Good | Good | Marginal |
| | 5 | 1.0 | Good | Good | Good |
| | 6 | 1.0 | Good | Good | Good |
| | 7 | 3.0 | Good | Good | Good |
| | 8 | 3.0 | Good | Good | Good |
| | 9 | 3.0 | Good | Good | Good |
| | 10 | 3.0 | Good | Good | Good |
| | 11 | 3.0 | Good | Good | Good |
| | 12 | 3.0 | Good | Good | Good |
| | 13 | 1.0 | Good | Good | Good |
| | 14 | 1.0 | Good | Good | Good |
| | 15 | 1.0 | Good | Good | Marginal |
| | 16 | 1.0 | Good | Good | Marginal |
| | 17 | 3.0 | Good | Good | Marginal |
| | 18 | 4.0 | Good | Good | Good |
| | 19 | 3.0 | Good | Good | Good |
| | 20 | 3.0 | Good | Good | Good |
| | 21 | 3.0 | Good | Good | Good |
| | 22 | 3.0 | Good | Good | Good |
| | 23 | 5.0 | Good | Good | Marginal |
| | 24 | 3.0 | Good | Good | Marginal |
| | 25 | 3.0 | Good | Good | Good |
| | 26 | 3.0 | Good | Good | Good |
| | 27 | 3.0 | Good | Good | Good |
| | 28 | 1.5 | Good | Good | Good |
| Comparative Examples | 1 | 1.0 | Good | Good | Poor |
| | 2 | 1.0 | Good | Poor | — |
| | 3 | 8.0 | Good | Good | Poor |
| | 4 | 1.0 | Poor | Poor | Poor |
| | 5 | 3.0 | Poor | Poor | Poor |

REFERENCE SIGNS LIST

1 Seamless can
2 Body section
3 Bottom section
3a Dome portion
3b Ground-contacting portion
3c Chime portion
4 Neck-in portion
5 Flange portion
6 Annular concave portion
7 Corner portion
8 Center panel
10 Metal sheet
11 Polyester-based paint film containing colorant
12 Thermoplastic resin coating
13 Primer
14 Thermoplastic resin coating

The invention claimed is:

1. A seamless can comprising a bottom section and a body section, the seamless can having a thermoplastic resin coating that is formed over a polyester-based paint film on an outer surface side of the can,
the polyester-based paint film comprising a polyester-based paint composition which contains:
a colorant in an amount of 20 parts by mass or less relative to 100 parts by mass of a total resin solid content, and
a curing agent in an amount of 5 to 43 parts by mass relative to 100 parts by mass of a polyester resin,
wherein an entire outer surface of the can, which includes the bottom section, is colored, and
the polyester-based paint composition consists of a polyester resin, the colorant, the curing agent, a curing catalyst, and an organic solvent.

2. The seamless can according to claim 1, wherein the bottom section comprises:
a bottom portion that is bulging upward and located in a central portion of the bottom section,
a ground-contacting portion that is descending from a peripheral edge of the bottom portion, and
a chime portion that is extending outward and upward with an inclination from the ground-contacting portion and reaching a lower end of the body section.

3. The seamless can according to claim 1, wherein a printed image is formed such that the bottom section is located in an upper portion of the seamless can in an upright state.

4. The seamless can according to claim 1, wherein the polyester-based paint film has a thickness of 7 μm or less.

5. The seamless can according to claim 4, wherein the bottom section comprises:
a bottom portion that is bulging upward and located in a central portion of the bottom section,
a ground-contacting portion that is descending from a peripheral edge of the bottom portion, and
a chime portion that is extending outward and upward with an inclination from the ground-contacting portion and reaching a lower end of the body section.

6. The seamless can according to claim 4, wherein a printed image is formed such that the bottom section is located in an upper portion of the seamless can in an upright state.

7. A resin-coated metal sheet for forming a seamless can, the resin-coated metal sheet comprising a thermoplastic resin coating that is applied over a polyester-based paint film on a surface of the metal sheet, which is a surface that serves as an outer surface of a can,
the polyester-based paint film comprising a polyester-based paint composition which contains:
a colorant in an amount of 20 parts by mass or less relative to 100 parts by mass of a total resin solid content, and
a curing agent in an amount of 5 to 43 parts by mass relative to 100 parts by mass of a polyester resin, and
the polyester-based paint film having a thickness of 7 μm or less, and
the polyester-based paint composition consisting of a polyester resin, the colorant, the curing agent, a curing catalyst, and an organic solvent.

8. The resin-coated metal sheet according to claim 7, wherein the metal sheet is a pure aluminum sheet or an aluminum alloy sheet.

9. The resin-coated metal sheet according to claim 7, wherein the polyester-based paint composition contains the polyester resin as a base resin, and any of a phenolic resin, an amino resin, or an isocyanate compound as the curing agent.

10. The resin-coated metal sheet according to claim 9, wherein the metal sheet is a pure aluminum sheet or an aluminum alloy sheet.

* * * * *